L. KERCHER AND A. T. AND G. T. RONK.
EXCAVATING MACHINE.
APPLICATION FILED APR. 9, 1920.
1,403,418.
Patented Jan. 10, 1922.
7 SHEETS—SHEET 1.
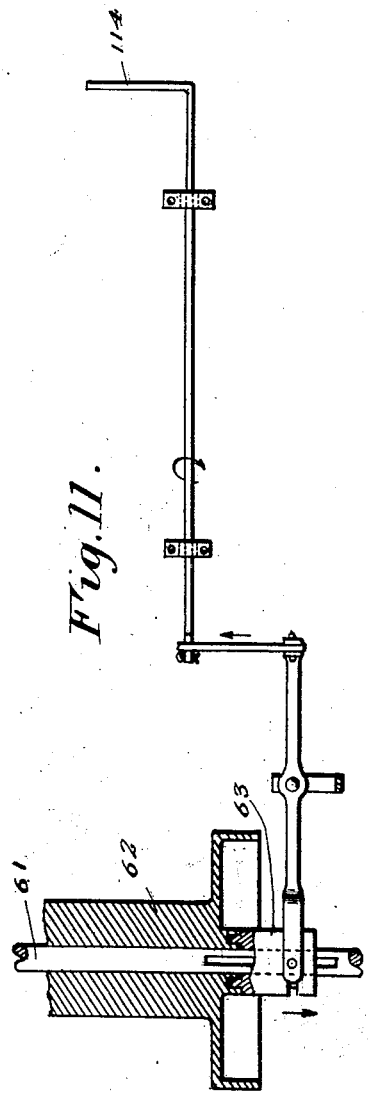
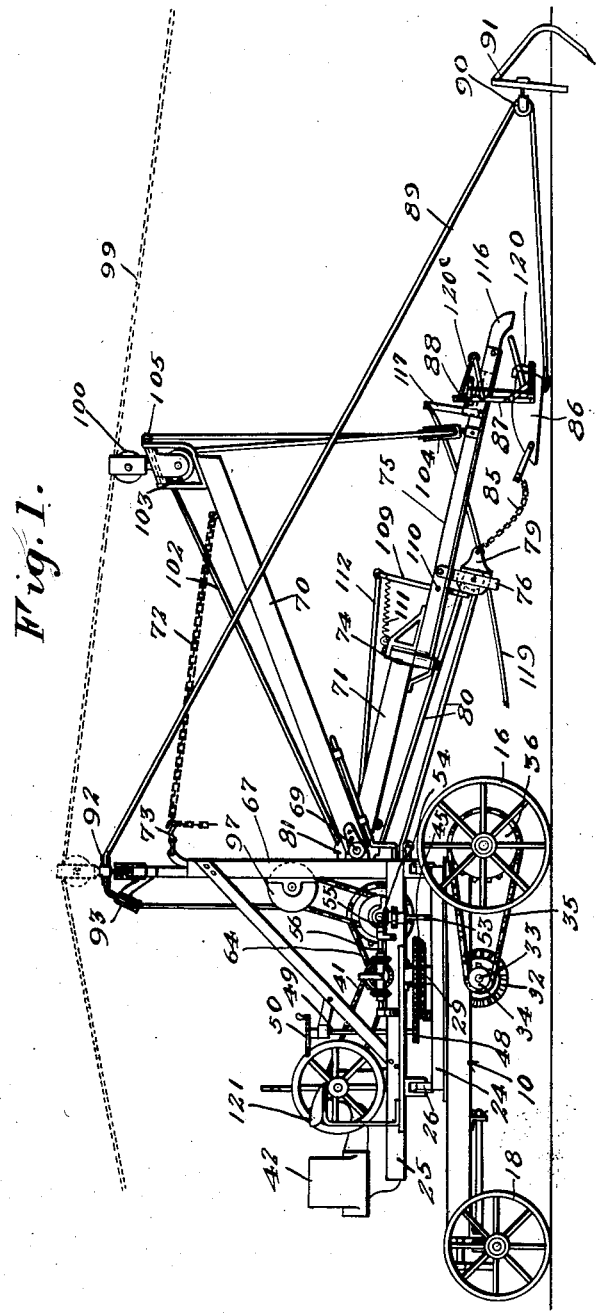
Leroy Kercher
A.T.Ronk
G.T.Ronk  INVENTOR
BY *Victor J. Evans*
ATTORNEY
*R. Q. Thomas*
WITNESSES

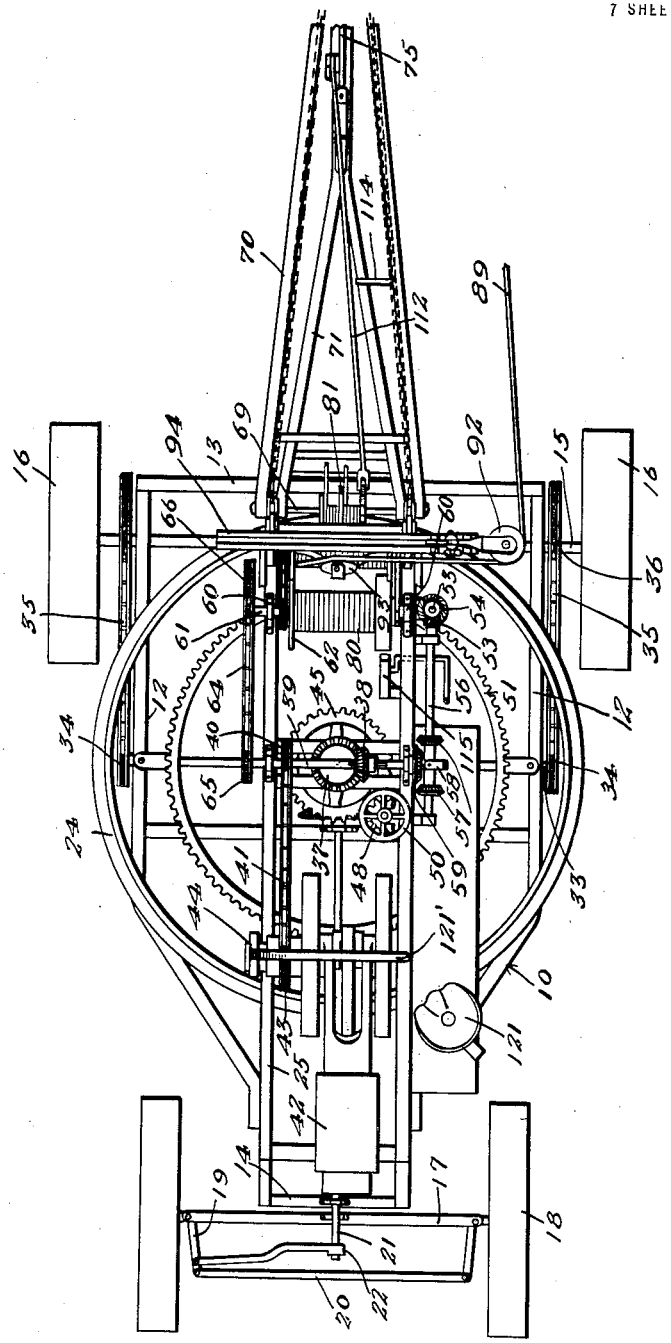

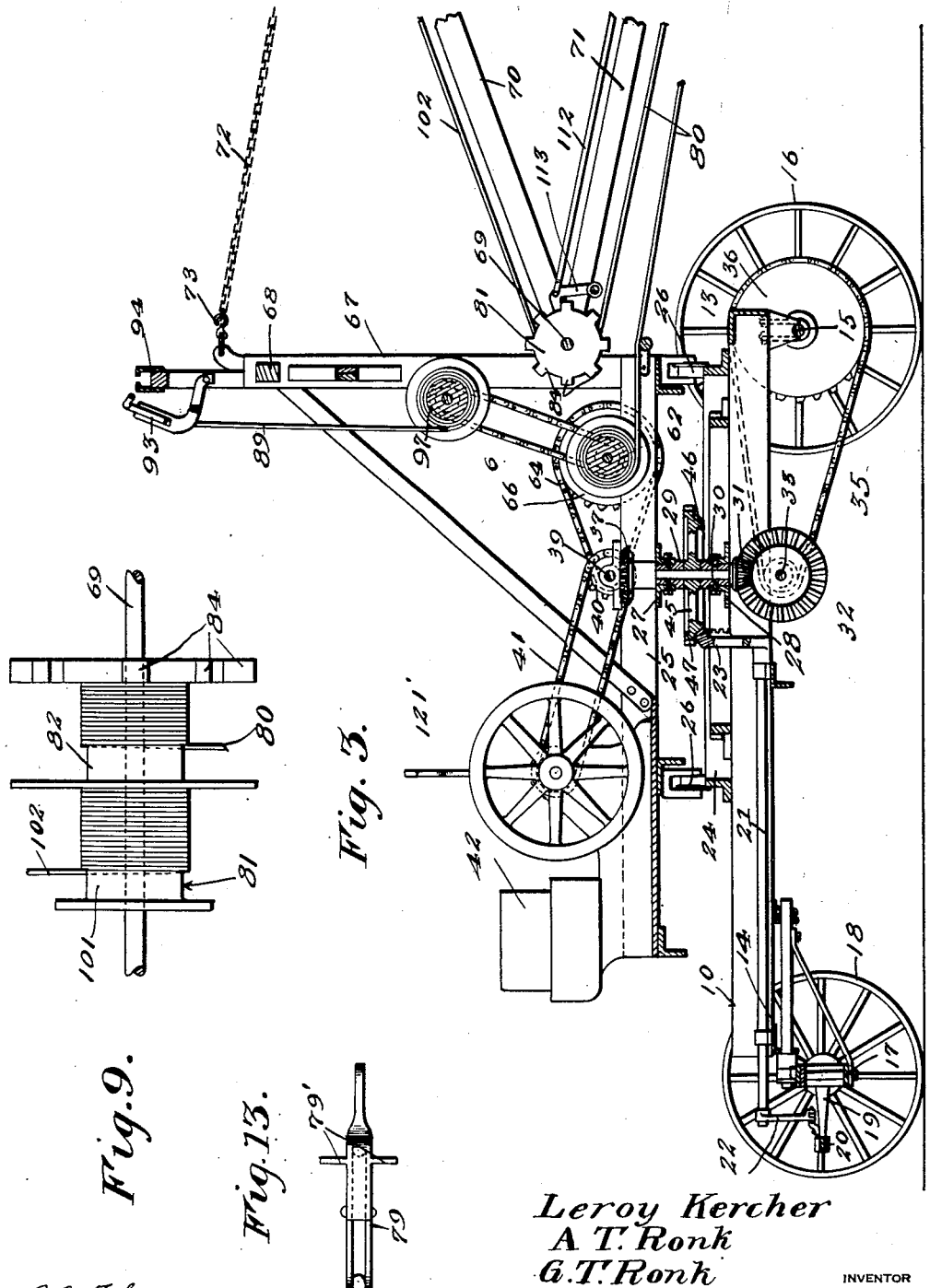

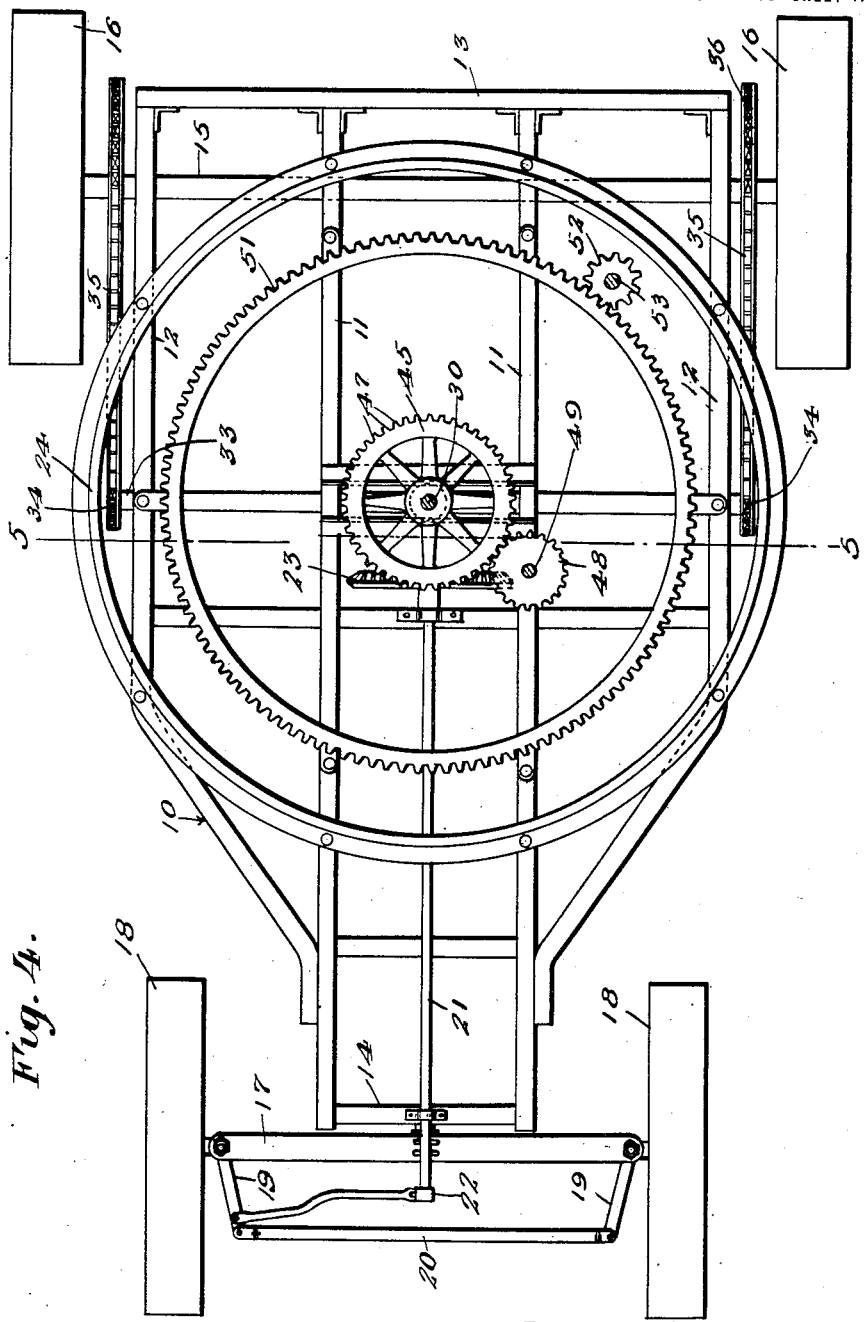

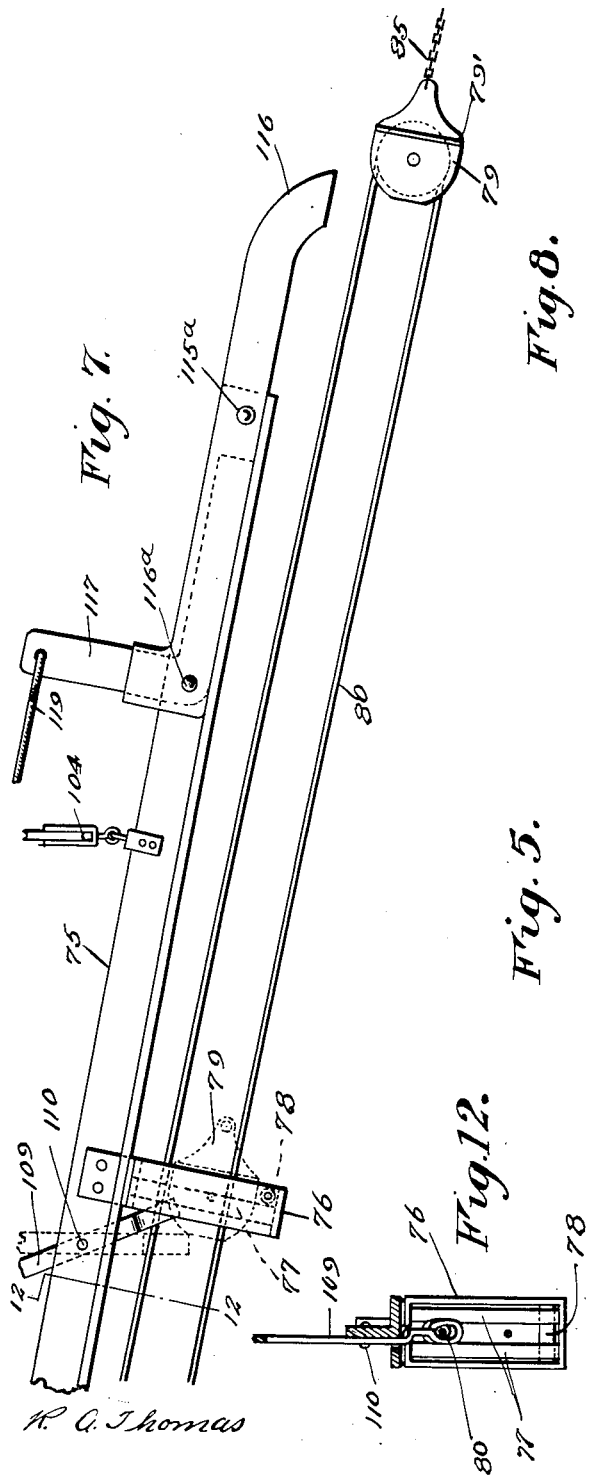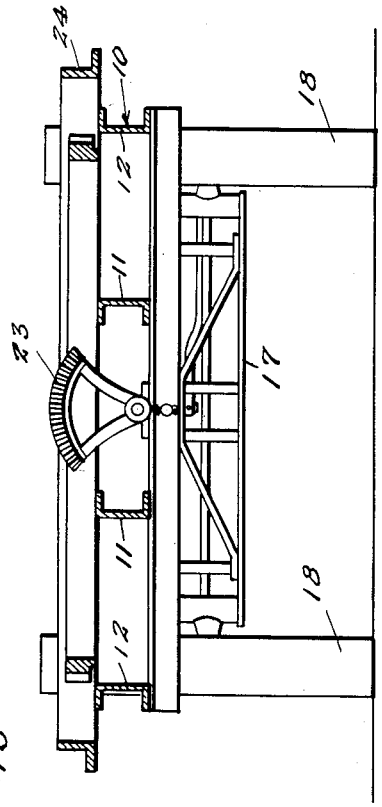

L. KERCHER AND A. T. AND G. T. RONK.
EXCAVATING MACHINE.
APPLICATION FILED APR. 9, 1920.
1,403,418.
Patented Jan. 10, 1922.
7 SHEETS—SHEET 6.
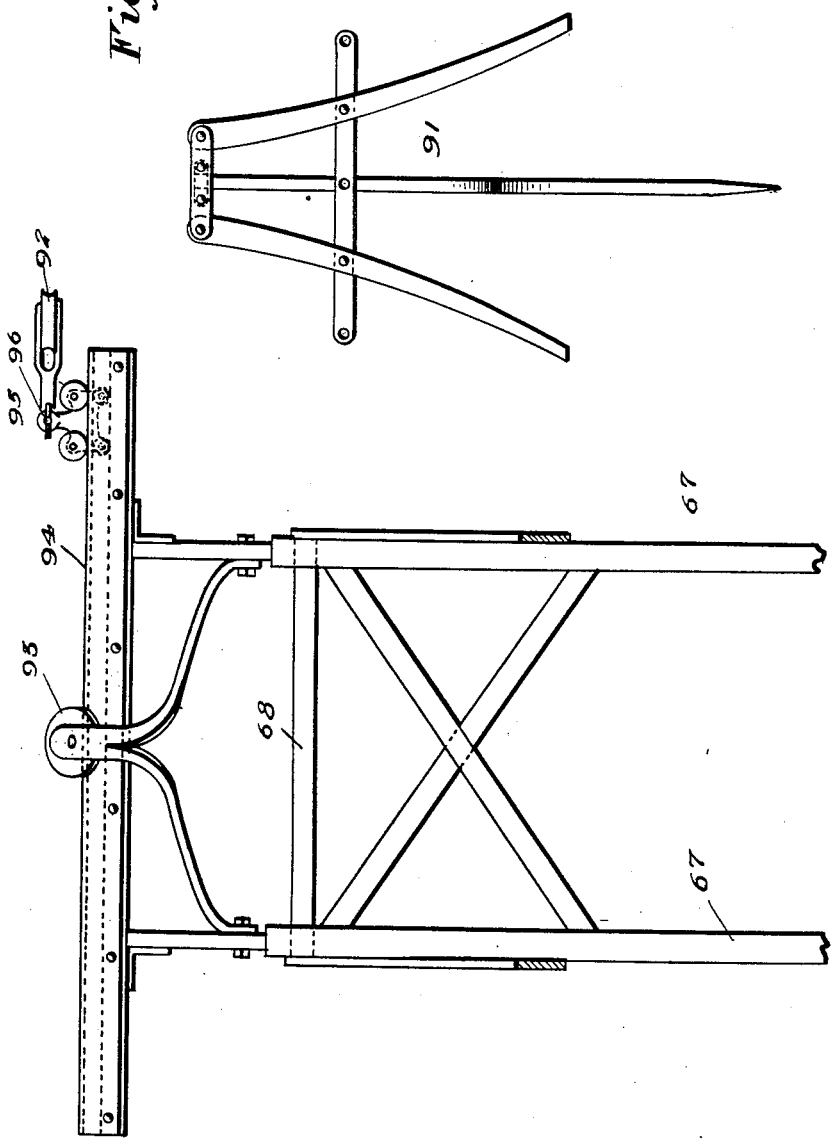
Leroy Kercher
A. T. Ronk
G. T. Ronk
INVENTOR
BY Victor J. Evans
ATTORNEY
R. A. Thomas
WITNESSES

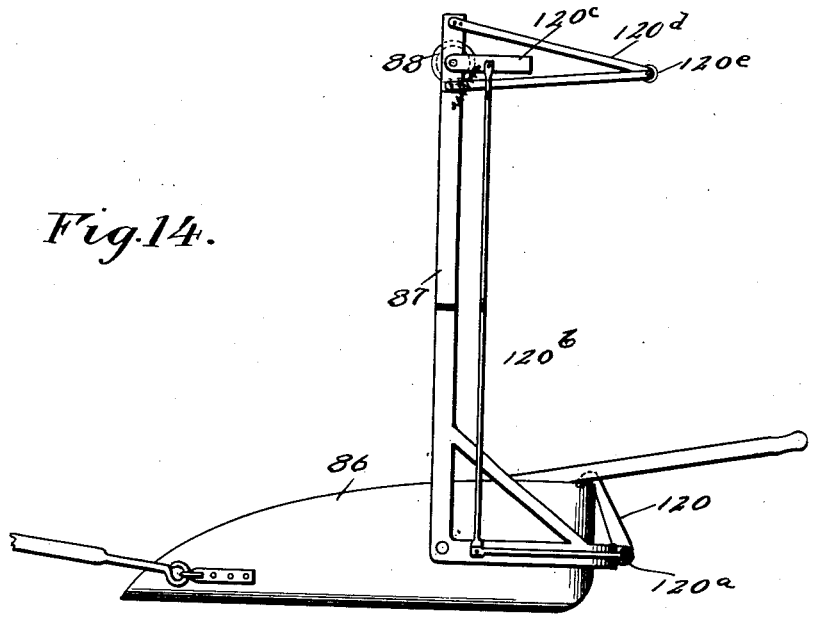
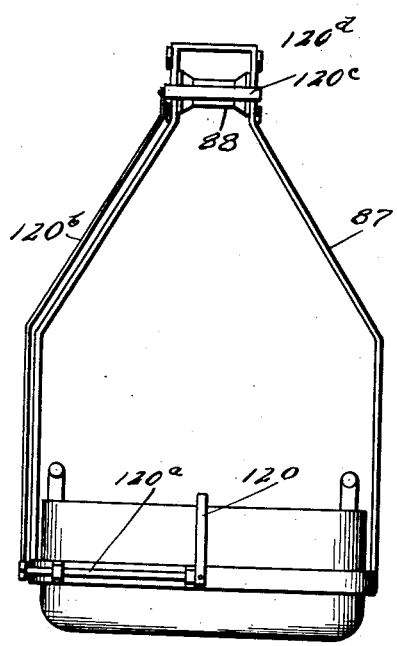

UNITED STATES PATENT OFFICE.

LEROY KERCHER, OF NEAR ROANN, AND ALBERT T. RONK, OF WARSAW, INDIANA, AND GEORGE T. RONK, OF LEON, IOWA, ASSIGNORS TO THE SPEEDER MACHINERY CORPORATION, OF LEON, IOWA, A CORPORATION OF IOWA.

EXCAVATING MACHINE.

1,403,418.  Specification of Letters Patent.  Patented Jan. 10, 1922.

Application filed April 9, 1920. Serial No. 372,524.

*To all whom it may concern:*

Be it known that we, LEROY KERCHER, of near Roann, in the county of Miami and State of Indiana, ALBERT T. RONK, of Warsaw, in the county of Kosciusko and State of Indiana, and GEORGE T. RONK, of Leon, in the county of Decatur and State of Iowa, all citizens of the United States, have invented new and useful Improvements in Excavating Machines, of which the following is a specification.

This invention relates to improvements in excavating machines of the type which, in addition to digging or excavating, will haul, hoist and dump the excavated material by means of booms and cables.

Another object of the invention is the provision of an excavating machine, which will convey the material from a remote point from the central machine or operating mechanism by the use of a scoop or slip, operated by a cable or cables, the material being conveyed from any direction toward the central machine or operating mechanism.

Another object is the provision of means for automatically guiding the scoop and for automatically raising and lowering the same.

Another object is the provision of means for preventing fouling of the hauling cable with either the lifting boom or scoop, during the dumping operation.

Another object is the provision of means for hoisting and dumping the excavated material when conveyed to the central machine or operating mechanism, by hoisting the material in the scoop and dumping the same in any direction, provision being made for dumping the scoop accurately into a small space, such as wagon box or body when desired.

A further object is the provision of means for returning the scoop to the place of loading by means of a return cable connected to the motor or other prime mover on machine and by the same means, move and guide the scoop over a widely distributed area as required in the building of levees or grading or for dumping in wagons, cars or other containers.

Other objects and advantages of the invention will appear as the following description is read in connection with the accompanying drawings.

In the drawings:—

Figure 1 is a side elevation of an excavating machine embodying the present invention.

Figure 2 is a plan view of the same.

Figure 3 is a vertical longitudinal sectional view.

Figure 4 is a plan view with the rotatable frame removed.

Figure 5 is a sectional view on the line 5—5 of Figure 4.

Figure 6 is an enlarged detail elevation of the upper end of the boom standard.

Figure 7 is a fragmentary side elevation showing the position of the loading cage and sheave when the scoop is positioned beyond the end of the boom.

Figure 8 is an enlarged sectional view on the line 8—8 of Figure 1.

Figure 9 is an enlarged detail sectional view of the compensating drum.

Figure 10 is a detail of the anchor looking at right angles to Figure 1.

Figure 11 is a detail view of the automatic clutch for the main drum.

Figure 12 is a detail section on the line 12—12 of Figure 7.

Figure 13 is a detail plan view of the traveling sheave.

Figure 14 is a side elevation of the scoop.

Figure 15 is a view at right angles to Figure 14.

Referring to the drawings in detail, the reference character 10 indicates the main frame, which includes longitudinal parallel members 11 and side members 12, all of the said members being connected at one end by a bar 13, while the forward end of the members 10 are connected to the members 11, the latter being connected by a cross piece 14. This frame will be hereinafter referred to as the stationary frame and is mounted upon a rear axle 15, which is supported by wheels 16, the latter constituting the driving wheels of the machine. The frame 10 is further supported by a front axle 17, which carries wheels 18, the said wheels being connected to the front axle by a knuckle 19, so as to provide steering wheels for the machine. The knuckles 19 are connected by a rod 20, so as to operate in unison, the operation being effected through a steering rod 21, which is disposed longitudinally of the machine and is provided at its front end with a crank arm 22, which is in turn connected to one of the knuckles 19. The steering rod 21, has secured upon its inner end a toothed segment 23, which is operated by a steering wheel hereinafter referred to for the purpose of guiding the machine.

The main frame 10 has mounted thereon a stationary track 24, the latter supporting a rotatable frame 25, to the bottom of which is secured rollers 26, which ride over the track 24. Mounted in bearings or brackets 27 and 28, is a sleeve 29 and passing through this sleeve is a shaft 30, which has secured upon its lower end a beveled pinion 31, which engages a beveled gear 32, the latter being secured upon a transversely arranged drive shaft 33 mounted in bearings in the main frame 10. Secured upon each end of the shaft 33, are pulleys 34 over which passes a drive chain 35, for the operation of a sprocket 36 secured upon the rear axle 15 of the main frame. The upper end of the shaft 30 has secured thereon a beveled pinion 37, the latter engaging a similar pinion 38, which is secured upon a shaft 39, mounted in bearings transversely thereof and carried by the rotatable frame 25. The shaft 39 has secured near its outer end a sprocket wheel 40, which is driven by a chain 41 operated by a motor or other prime mover 42 carried by the rotatable frame 25. The chain 41 passes over a sprocket 43, which is controlled by a clutch 44, by means of which the movement of the machine may be controlled.

Mounted upon the sleeve 29, is a gear 45, the latter being provided with beveled teeth 46 which engage the teeth of the segment 23, which are likewise beveled. The gear 45 is further provided with spur teeth 47, which engage a pinion 48 mounted upon a steering post 49, which is controlled by a hand wheel 50. This arrangement permits the steering of the front wheels of the machine, irrespective of the position of the rotatable frame.

Mounted upon the main or stationary frame 10, is a ring gear 51, which engages a pinion 52, mounted upon the lower end of a short vertically disposed shaft 53. The upper end of this shaft 53 carries a beveled worm gear 54, which engages a pinion 55 mounted upon one end of a longitudinally disposed shaft 56. Keyed upon this last mentioned shaft are spaced beveled gears 57, which are slidable upon the shaft by means of a clutch 58, so as to be moved into and out of engagement with a beveled gear 59 mounted upon the shaft 39. This provides for the rotation of the frame 25 through the medium of the motor or prime mover 42, the direction of rotation being controlled by the clutch 58, as will be readily understood.

Mounted in bearings 60 upon the rotatable frame 25, is a shaft 61, the said shaft carrying the main drum 62 which is adapted to be locked upon the shaft by means of a clutch 63. This shaft is rotated by means of a chain 64, which passes over a sprocket 65 mounted upon the shaft 39 and a sprocket 66 on the shaft 61. Any other suitable gearing may be substituted.

Also secured upon the rotatable frame 25, are two vertically disposed spaced standards 67, which are connected together by bars or rods 68. These standards provide bearings for a shaft 69, upon which is pivotally mounted booms 70 and 71. The first mentioned boom may be termed a stationary boom, but may be adjusted to a desired height through a medium of a chain 72, one end of which is secured to a hook 73 carried at the upper end of the standards 67.

The lower or lifting boom 71 is formed in sections, the adjacent ends of these sections being pivoted together as indicated at 74, while the outermost section 75 of this boom carries a cage 76 which depends from the under side of the boom. This cage is provided with spaced vertical rollers 77 and a horizontal roller 78, these rollers being adapted for engagement with a sheave 79 which is removably positioned within the cage between the rollers and is provided with side flanges 79' which engage the side edges of the cage so as to limit the inward movement of the sheave. Passing over this sheave is a cable 80, one end of which is wound upon the main drum 62 and the opposite end wound over what may be termed a compensating drum 81, which is mounted upon the shaft 69. This last mentioned drum is divided into separate drum sections and the cable 80 is wound upon the section 82, which is provided at one end with a relatively large flange 83, having a notched edge 84.

Also secured to the sheave 79, is a short chain or cable 85, the outer end of which is secured to a scoop 86, which is supported by a bail 87 from the section 75 of the lifting boom, the said bail being provided with a roller 88 which travels upon the upper edge of the lifting boom so as to permit of an inner and outer movement of the scoop along the boom.

The scoop 86 is also capable of movement beyond the outer end of the boom and for this purpose there is connected to the scoop a cable 89, which passes around a sheave 90, secured to an anchor 91, located at a point remote from the end of the boom. The cable 89 passes upward around a sheave 92 and thence downward through a sheave 93 around the reverse drum 97.

Extending transversely across the upper ends of the standards 67, is a track 94 and mounted upon this track and capable of movement longitudinally of the same is a carriage 95. This carriage has secured thereto the sheave 92, which is connected to the carriage by means of a ball and socket joint 96. Under ordinary working conditions of the machine this sheave 92 is inclined either toward the right or left as shown in Figure 6 of the drawings and the cable 89 passes from the reverse drum 97, which is also mounted on the standards 67, to one end of the track 94 and held at this end of the track by locking the sheave 92 against accidental movement, so that it will not be in the line of operation of either the booms, or the incoming scoop. Any suitable means may be employed for holding the sheave in position. In the event of the boom 70 and frame being swung in an opposite direction, the carriage 95 is run over to the opposite side of the track and locked in position there. The cable 89, in operation pulls the scoop 86 rearward toward the anchor and is thus always guided outward from the machine in the opposite direction from which the boom is swinging.

In some classes of work, it is desirable to use a dragline tramway cable, such as is indicated at 99 by the dotted lines in Figure 1. When this is done, the cable will pass through a suitable sheave (not shown) beyond the anchor 91 and upward over the sheave 92, which, for this purpose is raised to the position shown by the dotted lines in Figure 1, the carriage 95 being free to travel over the track 98, to allow the tramway cable to wave to and fro with the swinging of the boom 70, which boom carries a sheave 100 having a swiveled connection with the said boom, to guide the cables. The opposite end of the cable may be anchored at any point beyond the end of the machine.

The other section 101 of the compensating drum 81, has connected thereto one end of a cable 102, the said cable being wound upon the drum in a reverse direction from the cable 80 and passing outward over the boom 70 and through a sheave 103 carried at the extremity of the boom. The cable 102 then passes downwardly through a sheave 104, which is secured to the outer section 75 of the carrying boom and upward, where it is secured as indicated at 105.

As before stated, the lower or carrying boom is made in two sections. The outer section 75 of which is capable of free lateral movement for the reception of the bail 87 of the scoop 86, for elevation, the said boom being raised and lowered by the cable 102. The track 75 on the carrying boom, as before stated supports a locking cage 76 and upon the rearward movement of the scoop 86, due to the operation of the reverse drum, the sheave 79 travels to the outer end of the boom.

Upon the forward movement of the scoop the sheave 79 travels outward beneath the outer end of the boom, being removed from the cage 76 as illustrated in Figure 7 of the drawings. Upon its return movement, the sheave 79 enters the cage between the rollers and its inward movement is arrested by the space 79'. At this point the sheave strikes a lever 109 which is pivotally mounted upon the boom and is provided with an eye through which the upper flight of the cable 80 passes, the pivotal mounting of the lever 109 being indicated at 110. The upper end of this lever is connected to the boom by means of a spring 111 an eye being provided for this purpose, as shown in Figure 1 of the drawings. Also pivotally connected to the lever 109, is a rod 112, the inner end of this rod being connected to a dog 113, which is normally engaged with the notches in the end of the flange 83, under the influence of the spring 111.

When the cage 77, thus traveling inward strikes the lever 109, it disengages the dog 113 from the disk 83. When disengaged, the action of the cage will, after it has come to rest, cause the compensating drum to spin, as the free end of the cable 80 is wound around the section 82 of the said drum. This spinning and unwinding of the cable 80, winds up the cable 102 which is connected to the other section of the compensating drum and raises the carrying booms 71, 75. When the carrying boom has reached its maximum height, the inner end of the said boom strikes a lever 114, which is mounted upon the boom 70 and automatically throws out the clutch 60 of the main drum 62. The drum is provided with a brake 115, so that the booms may be held in this position until the rotatable frame swings to the desired position through the action of a gearing previously described. The release of the brake 115 will permit the carrying boom to drop by gravity. This unwinds the cables 102 and winds the cable 80 for the next operation. When the carrying boom has lowered sufficiently to drop the scoop 86, the cage 77 travels outward by gravity or by action of the cable 89 through the reverse drum. This outward movement of the cage permits the spring 111 to move the dog 113 into engagement with the notches in the compensating drum so as to stop its revolving motion and to hold the carrying drum at proper height for the next operation of the scoop 86.

Pivotally mounted upon the outer end of the carrying boom as indicated at 115$^a$, is a downwardly extending lever 116, the purpose of which is to guide the bail of the scoop upon the outer end of the boom in the event of the latter not being accurately adjusted.

A tripping lever 117 is pivotally mounted as indicated at 116$^a$ on the outer end of the carrying boom, and has connected thereto one end of a cable 119, the opposite end of which extends to within convenient reach of the operator of the machine. This trip operates the latch 120 mounted upon the scoop, so that the scoop may be dumped by operating the cable 119. The latch 120 is pivotally mounted as indicated at the rear end of the scoop upon one end of a rock shaft 120$^a$, the opposite end of this rock shaft being pivoted to a rod 120$^b$ whose upper end is pivoted to a spring controlled boom 120$^c$, the latter being mounted upon the bail 87 within a frame 120$^d$. The outer end of this frame carries a roller 120$^e$, so that when the boom is tilted it will be engaged by this roller and contact prevented with the boom 120$^c$. The free end of the tripping lever 117 however, is located beneath the boom 120$^c$ so that a tool upon the cable 119 will operate the latch and dump the scoop, while the frame 120$^d$ will prevent accidental dumping.

A seat 121 is mounted upon a small platform carried by the rotatable frame and extending to within convenient reach of the occupant of the seat is a lever 121' for controlling the operation of the engine or prime mover 42. Suitable controlling levers may also extend from the clutches for the drums and the brakes for the said drums.

It is believed that when the foregoing description is read in connection with the accompanying drawings, the construction, operation and advantages of the invention will be apparent. The right is reserved to make such changes in the form, proportions and minor details of construction as properly fall within the scope of the appended claims.

Having described the invention what is claimed is:—

1. An excavating machine embodying a wheel supported base, a frame mounted for rotation thereon, a lifting boom pivotally mounted upon the rotatable frame, a sectional carrying boom, means for pivotally connecting the sections to permit of lateral swinging movement of the outer section, means for swinging the outer section independently, a bail supported scoop carried by the carrying boom, operating mechanism for moving the scoop longitudinally of and beyond the end of the last mentioned boom and means connecting the lifting boom and the carrying boom for raising the latter.

2. An excavating machine embodying a wheel supported base, a frame mounted for rotation thereon, a lifting boom pivotally mounted upon the rotatable frame, a carrying boom also pivotally mounted upon said frame, a bail supported scoop carried by the carrying boom, operating mechanism for moving the scoop longitudinally thereof and beyond the end of the last mentioned boom, a pivoted bail guiding lever located at the outer end of the carrying boom and means connecting the lifting boom with the carrying boom for raising the latter.

3. An excavating machine embodying a wheel supported base, a frame mounted for rotation thereon, a lifting boom pivotally mounted upon the rotatable frame, a carrying boom also pivotally mounted upon said frame, a bail supported scoop carried by the carrying boom, means including an automatically operated release mechanism for moving the scoop longitudinally of and beyond the end of the last mentioned boom, and means connecting the lifting boom with the carrying boom for raising the latter.

4. An excavating machine embodying a wheel supported base, a frame mounted for rotation thereon, a lifting boom pivotally mounted upon the frame, a carrying boom also pivotally mounted upon said frame beneath the lifting boom, a scoop carried by the carrying boom, means including a plurality of drum operated cables for operating the scoop, means for lifting the carrying boom, automatically operated means controlled by the lifting boom for controlling the operation of one of the scoop cables, and operating mechanism carried by the frame.

5. An excavating machine embodying a wheel supported base, a frame mounted for rotation thereon, a lifting boom pivotally mounted upon the frame, a carrying boom also pivotally mounted upon said frame, a bail supported scoop carried by the carrying boom, operating mechanism for moving the scoop longitudinally of and beyond the end of the last mentioned boom, said mechanism including an outhaul cable connected to one end of the scoop, an inhaul cable connected to the opposite end of said scoop and a sheave carried by the inhaul cable and included in the inhaul cable connected means and means connecting the lifting boom and carrying boom for raising the latter.

6. An excavating machine embodying a wheel supported base, a frame mounted for rotation thereon, a lifting boom pivotally mounted upon the rotatable frame, a carrying boom also pivotally mounted upon said frame, a bail supported scoop carried by the carrying boom, and operating mechanism for moving the scoop longitudinally thereof and beyond the end of the last mentioned boom, said mechanism including an outhaul cable connected to one end of the scoop, an inhaul cable connected to the opposite end of said scoop, a sheave carried by the inhaul cable and serving to connect the latter with the scoop, means operated by the sheave for controlling the operation of the inhaul cable and means connecting the lifting boom and carrying boom for raising the latter.

7. An excavating machine embodying a wheel supported base, a frame mounted for rotation thereon, a lifting boom pivotally mounted upon the rotatable frame, a carrying boom also pivotally mounted upon said frame, a bail supported scoop carried by the carrying boom, operating mechanism for moving the scoop longitudinally thereof and beyond the end of the last mentioned boom, said mechanism including an outhaul cable connected to one end of the scoop, an inhaul cable connected to the opposite end of said scoop, a sheave carried by the inhaul cable and serving to connect the latter with the scoop, a spring actuated latch, means operated by the sheave for controlling the operation of the latch and means connecting the lifting boom and carrying boom for raising the latter.

8. An excavating machine embodying a wheel supported base, a frame mounted for rotation thereon, a lifting boom pivotally mounted upon the rotatable frame, a carrying boom also pivotally mounted upon said frame, a bail supported scoop carried by the carrying boom, operating mechanism for moving the scoop longitudinally thereof and beyond the end of the last mentioned boom, a bail guiding lever located at the outer end of the carrying boom and means connecting the lifting boom with the carrying boom for raising the latter.

9. An excavating machine embodying a wheel supported base, a frame mounted for rotation thereon, a lifting boom mounted upon the rotatable frame, a carrying boom pivotally mounted upon said frame, a bail supported scoop carried by the said boom, operating mechanism for moving the scoop along and beyond the end of the last mentioned boom, a bail guide arm located at the outer end of the carrying boom and means connecting the lifting boom with the carrying boom for raising the latter.

10. An excavating machine embodying a wheel supported base, a frame mounted for rotation thereon, a lifting boom mounted upon the rotatable frame, a carrying boom pivotally mounted upon said frame, a bail guide arm located at the outer end of the carrying boom, a bail supported scoop carried by the said boom, operating means for moving the scoop longitudinally of and beyond the end of the guide arm and boom, means for dumping the scoop and means for connecting the lifting boom and the carrying boom for raising the latter.

11. An excavating machine embodying a wheel supported base, a frame mounted for rotation thereon, a lifting boom mounted on the rotatable frame, a carrying boom pivotally mounted upon said frame, means carried by the lifting boom for raising and lowering the carrying boom, a guide arm located at the outer end of said carrying boom, a bail supported scoop carried by the carrying boom, operating mechanism for moving the scoop longitudinally of and beyond the outer end of the guide arm, said mechanism including an outhaul cable connected with the outer end of said scoop and means for returning the scoop to a position whereby the operating bail will be engaged by the guide arm of the carrying boom, the last mentioned mechanism including an inhaul cable, means for operating said cables and means for dumping the scoop.

In testimony whereof we affix our signatures.

LEROY KERCHER.
ALBERT T. RONK.
GEORGE T. RONK.